(12) United States Patent
Ishihara et al.

(10) Patent No.: US 8,338,020 B2
(45) Date of Patent: Dec. 25, 2012

(54) MULTI-LAYER MICROPOROUS FILM

(75) Inventors: Takeshi Ishihara, Nasushiobara (JP); Satoshi Miyaoka, Nasushiobara (JP); Koichi Kono, Nasushiobara (JP); Patrick Brant, Seabrook, TX (US)

(73) Assignee: Toray Battery Separator Film Co., Ltd. (JP)

( * ) Notice: Subject to any disclaimer, the term of this patent is extended or adjusted under 35 U.S.C. 154(b) by 0 days.

(21) Appl. No.: 13/322,647

(22) PCT Filed: Jun. 8, 2010

(86) PCT No.: PCT/US2010/037758
§ 371 (c)(1),
(2), (4) Date: Nov. 28, 2011

(87) PCT Pub. No.: WO2010/147799
PCT Pub. Date: Dec. 23, 2010

(65) Prior Publication Data
US 2012/0077072 A1   Mar. 29, 2012

Related U.S. Application Data

(60) Provisional application No. 61/218,720, filed on Jun. 19, 2009, provisional application No. 61/298,756, filed on Jan. 27, 2010, provisional application No. 61/298,752, filed on Jan. 27, 2010, provisional application No. 61/346,675, filed on May 20, 2010, provisional application No. 61/351,380, filed on Jun. 4, 2010.

(51) Int. Cl.
*H01M 2/18* (2006.01)

(52) U.S. Cl. ......... 429/145; 429/122; 429/129; 429/144

(58) Field of Classification Search .................. 429/145
See application file for complete search history.

(56) References Cited

U.S. PATENT DOCUMENTS

| 4,873,037 | A | * | 10/1989 | Chau et al. ............. | 264/49 |
| 5,084,534 | A | | 1/1992 | Welborn, Jr. et al. | |
| 5,616,246 | A | * | 4/1997 | Gagnon et al. .......... | 204/240 |
| 6,100,334 | A | * | 8/2000 | Abdou-Sabet ........... | 525/191 |
| 2009/0134538 | A1 | * | 5/2009 | Takita et al. ............ | 264/28 |

FOREIGN PATENT DOCUMENTS

| WO | 97/23554 | 7/1997 |
| WO | 2007/052663 | 5/2007 |
| WO | 2007/132942 | 11/2007 |
| WO | 2008/016174 | 2/2008 |
| WO | 2008/140835 | 11/2008 |

OTHER PUBLICATIONS

Patrick Brant et al. "Effect of Tacticity on the Dilute Solution Coil Dimensions of Poly (α-olefins)s", Mar. 8, 2005, vol. 38, pp. 7181-7183, *Macromolecules*, American Chemical Society.

Sun, T. et al., "Effect of Short Chain Branching on the Coil Dimensions of Polyolefins, in Dilute Solution," *Macromolecules*, 2001, vol. 34, No. 19, pp. 6812-6820 (1 page Abstract).

* cited by examiner

*Primary Examiner* — Barbara Gilliam
*Assistant Examiner* — Gary Harris
(74) *Attorney, Agent, or Firm* — DLA Piper LLP (US)

(57) ABSTRACT

Embodiments of the invention relate to microporous membranes that include first and second layers. The first layer includes ≦20.0 wt. % polymethylpentene and the second layer includes a compatibilizer. The invention also relates to methods for making such membranes and the use of such membranes as battery separator film.

6 Claims, No Drawings

MULTI-LAYER MICROPOROUS FILM

CROSS-REFERENCE TO RELATED APPLICATIONS

The present application claims priority from U.S. Ser. No. 61/298,752, filed Jan. 27, 2010, and claims the benefit of and priority from U.S. Ser. No. 61/298,756, filed Jan. 27, 2010; U.S. Ser. No. 61/218,720, filed Jun. 19, 2009; U.S. Ser. No. 61/346,675, filed May 20, 2010, and U.S. Ser. No. 61/351,380, filed Jun. 4, 2010, all of which are incorporated by reference in their entirety.

FIELD OF THE INVENTION

Embodiments of the invention relate to microporous membranes that include first and second layers. The first layer includes $\geq 20.0$ wt. % polymethylpentene and the second layer includes compatibilizer. The invention also relates to methods for making such membranes and the use of such membranes as battery separator film.

BACKGROUND OF THE INVENTION

Microporous membranes can be used as battery separator film ("BSF") in, e.g., lithium ion batteries. Large-capacity batteries such as those that can be used to power electric vehicles and hybrid electric vehicles could be improved by increasing the BSFs meltdown temperature and puncture strength without significantly decreasing other important membrane properties such as porosity, permeability, and thermal stability (heat shrinkage). Increasing strength is important because it reduces the risk of internal short circuits resulting from BSF failure.

Monolayer BSFs comprising (i) polymethylpentene and polyethylene and (ii) polymethylpentene and polypropylene have meltdown temperatures $\geq 200°$ C., but these films have a lower pin puncture strength than BSFs comprising polyethylene and/or polypropylene.

SUMMARY OF THE INVENTION

In an embodiment, the invention relates to a membrane comprising:
(a) a first layer including $\geq 20.0$ wt. % polymethylpentene based on the weight of the first layer; and
(b) a second layer which (i) includes a compatibilizer and (ii) has a composition that is not substantially the same as that of the first layer, wherein the membrane is microporous and dimensionally-stable.

In another embodiment, the invention relates to method for producing a microporous membrane, comprising:
(a) forming a first mixture comprising a first diluent and a first polymer blend, the first polymer blend comprising $\geq 20.0$ wt. % polymethylpentene based on the weight of the first polymer;
(b) forming a second mixture comprising a second diluent and a second polymer blend, the second polymer blend comprising a compatibilizer;
(c) forming a third mixture comprising a third diluent and a third polymer blend, the third polymer blend comprising $\geq 20.0$ wt. % polymethylpentene based on the weight of the third polymer;
(d) producing a sheet comprising a first layer comprising the first mixture, a third layer comprising the third mixture, and a second layer comprising the second mixture, the second layer being located between the first and third layers; and
(e) removing at least a portion of the first, second, and third diluents from the sheet. The invention also relates to the membrane produced by such a method.

In yet another embodiment, the invention relates to a battery comprising an anode, a cathode, an electrolyte, and at least one separator located between the anode and cathode, the separator comprising a first layer including $\geq 20.0$ wt. % polymethylpentene based on the weight of the first layer; and a second layer including a compatibilizer, wherein the separator is a microporous, dimensionally-stable membrane.

DETAILED DESCRIPTION OF ILLUSTRATIVE EMBODIMENTS

Microporous membranes comprising $\geq 20.0$ wt. % polymethylpentene and $\leq 60.0$ wt. % polyethylene (based on the weight of the membrane) have relatively high meltdown temperature and relatively low heat shrinkage, but have relatively low strength. Microporous membranes comprising 100 wt. % polyethylene or a mixture of polyethylene and polypropylene have higher strength, but lower meltdown temperature and higher heat shrinkage. It has been found that multi-layer membranes including a first layer comprising $\geq 20.0$ wt. % polymethylpentene and $\leq 60.0$ wt. % polyethylene (based on the weight of the first layer) and a second layer comprising polyethylene can exhibit dimensional instabilities such as delamination. The invention is based in part on the discovery of multi-layer microporous membranes having first layer and second layers, wherein the first layer includes polymethylpentene and the second layer includes a species compatible with the polymethylpentene of the first layer (e.g., a compatibilizer). It has been found that such membranes have improved dimensional stability (e.g., are more resistant to delamination) compared to membranes that do not contain a compatibilizer in the second layer.

For the purpose of this description and the appended claims, the term "polymer" means a composition including a plurality of macromolecules, the macromolecules containing recurring units derived from one or more monomers. The macromolecules can have different size, molecular architecture, atomic content, etc. The term "polymer" includes macromolecules such as copolymer, terpolymer, etc. "Polyethylene" means polyolefin containing $\geq 50.0\%$ (by number) recurring ethylene-derived units, preferably polyethylene homopolymer and/or polyethylene copolymer wherein at least 85% (by number) of the recurring units are ethylene units. "Polypropylene" means polyolefin containing $>50.0\%$ (by number) recurring propylene-derived units, preferably polypropylene homopolymer and/or polypropylene copolymer wherein at least 85% (by number) of the recurring units are propylene units. "Polymethylpentene" means polyolefin containing $\geq 50.0\%$ (by number) recurring methylpentene-derived units, preferably polymethylpentene homopolymer and/or polymethylpentene copolymer wherein at least 85% by (number) of the recurring units are methylpentene units. A "microporous membrane" is a thin film having pores, where $\geq 90.0$ percent (by volume) of the film's pore volume resides in pores having average diameters in the range of from 0.01 μm to 10.0 μm. With respect to membranes produced from extrudates, the machine direction ("MD") is defined as the direction in which an extrudate is produced from a die. The transverse direction ("TD") is defined as the direction perpendicular to both MD and the thickness direction of the extrudate.

In an embodiment, the invention relates to dimensionally-stable microporous membranes having at least two layers and having relatively high strength, meltdown temperature, and thermal stability. The membranes of one or more embodiments have relatively high meltdown temperature and relatively low heat shrinkage deriving from the presence of ≧20.0 wt. % polymethylpentene in the first layer, have relatively high strength deriving from the presence of polyethylene in the second layer. Such membranes are less prone to delamination, it is believed, as a result of the presence of an effective amount of compatibilizer in the second layer. Selected embodiments will now be described in more detail, but this description is not meant to foreclose other embodiments within the broader scope of the invention.

Layer Constituents

In an embodiment, the first layer comprises ≧20.0 wt. % polymethylpentene, based on the weight of the first layer, and the second layer comprises polymer and a species compatible with the polymethylpentene.

Polymethylpentene

In an embodiment, the polymethylpentene ("PMP") comprises polymer or copolymer wherein at least 80.0% (by number) of the recurring units are methylpentene units. The desired PMP has a melting temperature (Tm)≧200.0° C., e.g., in the range of from 200.0° C. to 250.0° C., such as from 210.0° C. to 240.0° C., or from about 220.0° C. to about 230.0° C. It has been observed that when the membrane contains PMP having a Tm>240.0° C., and particularly >250.0° C., it is more difficult to produce a membrane that does not lose mechanical strength when exposed to a temperature>170.0° C. While not wishing to be bound by any theory or model, it is believed that this results from the difficulty in producing a uniform mixture of PMP and PE when the difference between PE Tm and PMP Tm is large. It has also been observed that when the membrane contains PMP having a Tm<200.0° C., it is more difficult to produce a membrane having a relatively high meltdown temperature. The PMP's Tm can be determined by differential scanning calorimetry methods similar to those described below for polypropylene.

In an embodiment, the PMP has a melt flow rate ("MFR" measured according to ASTM D 1238; 260° C./5.0 kg)≦80.0 dg/min., for example from about 0.5 dg/min. to 60.0 dg/min., such as from about 1 dg/min. to about 30 dg/min, e.g., in the range of 10 dg/min to 40 dg/min. When the MFR of PMP is >80.0 dg/min., it can be more difficult to produce a membrane having a relatively high meltdown temperature. In one or more embodiments, the PMP has an Mw in the range of $1.0×10^4$ to $4.0×10^6$. The PMP's Mw can be determined by gel permeation chromatography methods similar to those described below for polypropylene, as exemplified in "Macromolecules, Vol. 38, pp. 7181-7183 (2005)."

The PMP can be produced, e.g., in a polymerization process using a Ziegler-Natta catalyst system (such as catalyst systems containing titanium or titanium and magnesium) or a "single site catalyst". In an embodiment, the PMP is produced using methylpentene-1 monomer, such as 4-methylpentene-1, or methylpentene-1 with one or more comonomers, such as α-olefin by coordination polymerization. Optionally, the α-olefin is one or more of butane-1, pentene-1,3-methylbutene-1, hexene-1,4-methylpentene-1, heptene-1, octane-1, nonene-1, and decene-1. Cyclic comonomer(s) such as cyclopentene, 4-methylcyclopentene, norbornene, tricyclo-3-decene, etc., can also be used. In an embodiment, the comonomer is hexene-1. The comonomer content in the PMP is generally ≦20.0 mol. %.

The PMP can be a mixture of PMPs (e.g., dry mixed or a reactor blend), to produce a mixture having a Tm≦250.0° C., e.g., ≦240.0° C.

Polyethylene

In particular embodiments, the polyethylene ("PE") can comprise a mixture or reactor blend of PE, such as a mixture of two or more polyethylenes ("PE1", "PE2", "PE3", "PE4", etc., as described below). For example, the PE can include a blend of (i) a first PE (PE1) and/or a second PE (PE2) and (ii) a fourth PE (PE4). Optionally these embodiments can further include a third PE (PE3).

PE1

In an embodiment, the first PE ("PE1") can be, e.g., one having an Mw<$1.0×10^6$, e.g., in the range of from about $1.0×10^5$ to about $0.90×10^6$, a molecular weight distribution ("MWD", defined as Mw divided by the number average molecular weight ("Mn")) in the range of from about 2.0 to about 50.0, and a terminal unsaturation amount <0.20 per $1.0×10^4$ carbon atoms. Optionally, PE1 has an Mw in the range of from about $4.0×10^5$ to about $6.0×10^5$, and an MWD of from about 3.0 to about 10.0. Optionally, PE1 has an amount of terminal unsaturation ≦0.14 per $1.0×10^4$ carbon atoms, or ≦0.12 per $1.0×10^4$ carbon atoms, e.g., in the range of 0.05 to 0.14 per $1.0×10^4$ carbon atoms (e.g., below the detection limit of the measurement). PE1 can be, e.g., SUNFINE®, SH-800® or SH-810® high density polyethylene, available from Asahi Kasei Chemicals Corporation.

PE2

In an embodiment, the second PE ("PE2") can be, e.g., PE having an Mw<$1.0×10^6$, e.g., in the range of from about $2.0×10^5$ to about $0.9×10^6$, an MWD in the range of from about 2 to about 50, and a terminal unsaturation amount ≧0.20 per $1.0×10^4$ carbon atoms. Optionally, PE2 has an amount of terminal unsaturation ≧0.30 per $1.0×10^4$ carbon atoms, or ≧0.50 per $1.0×10^4$ carbon atoms, e.g., in the range of about 0.6 to about 10.0 per $1.0×10^4$ carbon atoms. A non-limiting example of PE2 is one having an Mw in the range of from about $3.0×10^5$ to about $8.0×10^5$, for example about $7.5×10^5$, and an MWD of from about 4 to about 15. PE2 can be, e.g., Lupolen®, available from Basell.

PE1 and/or PE2 can be, e.g., an ethylene homopolymer or an ethylene/α-olefin copolymer containing ≦5.0 mole % of one or more comonomer such as α-olefin, based on 100% by mole of the copolymer. Optionally, the α-olefin is one or more of propylene, butene-1, pentene-1, hexene-1,4-methylpentene-1, octene-1, vinyl acetate, methyl methacrylate, or styrene. Such a PE can have a melting point ≧132° C. PE1 can be produced, e.g., in a process using a Ziegler-Natta or single-site polymerization catalyst, but this is not required. The amount of terminal unsaturation can be measured in accordance with the procedures described in PCT Publication No. WO 97/23554, for example. PE2 can be produced using a chromium-containing catalyst, for example.

PE3

In an embodiment, PE3 can be, e.g., PE having a Tm≦130.0° C. Using PE3 having a Tm≦130.0° C. can provide the finished membrane with a desirably low shutdown temperature, e.g., a shutdown temperature≦130.5° C.

Optionally, PE3 has a Tm≧85.0° C., e.g., in the range of from 105.0° C. to 130.0° C., such as 115.0° C. to 126.0° C. Optionally, the PE3 has an Mw≦$5.0×10^5$, e.g., in the range of from $1.0×10^3$ to $4.0×10^5$, such as in the range of from $1.5×10^3$ to about $3.0×10^5$. Optionally, the PE3 has an MWD in the range of from 2.0 to 5.0, e.g., 1.8 to 3.5. Optionally, PE3 has a mass density in the range of 0.905 g/cm³ to 0.935 g/cm³. Polyethylene mass density is determined in accordance with ASTM D1505.

In an embodiment, PE3 is a copolymer of ethylene and ≦5.0 mol. % of a comonomer such as one or more of propylene, butene-1, pentene-1, hexene-1,4-methylpentene-1, octene-1, vinyl acetate, methyl methacrylate, styrene, or other monomer. Optionally, the comonomer amount is in the range of 1.0 mol. % to 5.0 mol. %. In an embodiment, the comonomer is hexene-1 and/or octene-1.

PE3 can be produced in any convenient process, such as those using a Ziegler-Natta or single-site polymerization catalyst. Optionally, PE3 is one or more of a low density polyethylene ("LDPE"), a medium density polyethylene, a branched LDPE, or a linear low density polyethylene, such as a polyethylene produced by metallocene catalyst. PE3 can be produced according to the methods disclosed in U.S. Pat. No. 5,084,534 (such as the methods disclosed therein in examples 27 and 41), which is incorporated by reference herein in its entirety.

PE4

In an embodiment, the fourth PE ("PE4") can be, e.g., one having an Mw≧1.0×10⁶, e.g., in the range of from about 1.0×10⁶ to about 5.0×10⁶ and an MWD of from about 1.2 to about 50.0. A non-limiting example of PE4 is one having an Mw of from about 1.0×10⁶ to about 3.0×10⁶, for example about 2.0×10⁶, and an MWD of from about 2.0 to about 20.0, preferably about 4.0 to about 15.0. PE4 can be, e.g., an ethylene homopolymer or an ethylene/α-olefin copolymer containing≦5.0 mole % of one or more comonomers such as α-olefin, based on 100% by mole of the copolymer. The comonomer can be, for example, one or more of, propylene, butene-1, pentene-1, hexene-1,4-methylpentene-1, octene-1, vinyl acetate, methyl methacrylate, or styrene. Such a polymer or copolymer can be produced using a Ziegler-Natta or a single-site catalyst, though this is not required. Such a PE can have a melting point≧134° C. PE4 can be ultra-high molecular weight polyethylene ("UHMWPE"), e.g., HI-ZEX MIL-LION®, 240-m® polyethylene, available from Mitsui Chemicals, Inc.

The melting points of PE1-PE4 can be determined using the methods disclosed in PCT Patent Publication No. WO 2008/140835, for example.

Polypropylene

In an embodiment, the polypropylene ("PP") can be, e.g., PP having an Mw≧6.0×10⁵, such as ≧7.5×10⁵, for example in the range of from about 0.8×10⁶ to about 2.0×10⁶, such as in the range of about 0.9×10⁶ to about 3.0×10⁶. Optionally, the PP has a Tm≧160.0° C. and a heat of fusion ("ΔHm") ≧90.0 J/g, e.g., ≧100.0 J/g, such as in the range of from 110 J/g to 120 J/g. Optionally, the PP has an MWD≦20.0, e.g., in the range of from about 1.5 to about 10.0, such as in the range of from about 2.0 to about 8.5 or in the range of from 2.5 to 6.0. Optionally, the PP is a copolymer (random or block) of propylene and ≦5.0 mol. % of a comonomer, the comonomer being, e.g., one or more α-olefins such as ethylene, butene-1, pentene-1, hexene-1,4-methylpentene-1, octene-1, vinyl acetate, methyl methacrylate, and styrene, etc.; or diolefins such as butadiene, 1,5-hexadiene, 1,7-octadiene, 1,9-decadiene, etc.

In an embodiment the PP is isotactic polypropylene. The term "isotactic polypropylene" means PP having a meso pentad fraction ≧ about 50.0 mol. % mmmm pentads, optionally ≧ about 94.0 mol. % mmmm pentads, or preferably ≧96.0 mol. % mmmm pentads (based on the total number of moles of isotactic PP). In an embodiment, the PP has (a) a meso pentad fraction ≧ about 90.0 mol. % mmmm pentads, preferably ≧94.0 mol. % mmmm pentads; and (b) has an amount of stereo defects ≦about 50.0 per 1.0×10⁴ carbon atoms, e.g., ≦about 20 per 1.0×10⁴ carbon atoms, or ≦about 10 per 1.0×10⁴ carbon atoms, such as ≦about 5.0 per 1.0×10⁴ carbon atoms. Optionally, the PP has one or more of the following properties: (i) a Tm≧162.0° C.; (ii) an elongational viscosity ≧ about 5.0×10⁴ Pa sec at a temperature of 230° C. and a strain rate of 25 sec⁻¹; (iii) a Trouton's ratio ≧about 15 when measured at a temperature of about 230° C. and a strain rate of 25 sec⁻¹; (iv) a Melt Flow Rate ("MFR"; ASTM D-1238-95 Condition L at 230° C. and 2.16 kg)≦about 0.1 dg/min, optionally ≦about 0.01 dg/min (i.e., a value is low enough that the MFR is essentially not measurable); or (v) an amount extractable species (extractable by contacting the PP with boiling xylene)≦0.5 wt. %, e.g., ≦0.2 wt. %, such as ≦0.1 wt. % or less based on the weight of the PP.

In an embodiment, the PP is an isotactic PP having an Mw in the range of from about 0.8×10⁶ to about 3.0×10⁶, optionally 0.9×10⁶ to about 2.0×10⁶ an MWD≦8.5, e.g., in the range of from about 2.0 to about 8.5, optionally 2.0 to 6.0, and a ΔHm≧90.0 J/g. Generally, such a PP has a meso pentad fraction ≧94.0 mol. % mmmm pentads, an amount of stereo defects ≦about 5.0 per 1.0×10⁴ carbon atoms, and a Tm≧162.0° C.

A non-limiting example of the PP, and methods for determining the PP's Tm, meso pentad fraction, tacticity, intrinsic viscosity, Trouton's ratio, stereo defects, and amount of extractable species are described in PCT Patent Publication No. WO2008/140835, which is incorporated by reference herein in its entirety.

The PP's ΔHm, is determined by the methods disclosed in PCT Patent Publication No. WO2007/132942, which is incorporated by reference herein in its entirety. Tm can be determined from differential scanning calorimetric (DSC) data obtained using a PerkinElmer Instrument, model Pyris 1 DSC. Samples weighing approximately 5.5-6.5 mg are sealed in aluminum sample pans. The DSC data are recorded by first heating the sample to 230° C. at a rate of 10° C./minute, called first melt (no data recorded). The sample is kept at 230° C. for 10 minutes before a cooling-heating cycle is applied. The sample is then cooled from 230° C. to 25° C. at a rate of 10° C./minute, called "crystallization", then kept at 25° C. for 10 minutes, and then heated to 230° C. at a rate of 10° C./minute, called ("second melt"). The thermal events in both crystallization and second melt are recorded. The melting temperature ($T_m$) is the peak temperature of the second melting curve and the crystallization temperature ($T_c$) is the peak temperature of the crystallization peak.

Compatibilizer

In one or more embodiments, the compatibilizer is a composition (e.g., polymer or polymer blend) that when used in an effective amount improves the dimensional stability of the membrane (e.g., prevents delamination). The compatibilizer (referred to as "compatibilizer") can be a polymer or mixture of polymers, such as a reactor blend or dry mixture. While not wishing to be bound by any theory or model, it is believed that when present in the second layer in an amount ≧ the effective amount, the compatibilizer can improve the affinity (e.g., by reducing the surface tension) between a layer having a relatively high PE content (e.g., the second layer) and a layer having a relatively high PMP content (e.g., the first layer).

In one embodiment, the first layer comprises ≧20.0 wt. % PMP and the second layer comprises PE and a compatibilizer, the compatibilizer being, e.g., a polymer or polymer mixture that improves affinity between the first and second layers. In an embodiment, the compatibilizer (i) comprises polymer (including mixtures of polymer) and (ii) satisfies the following relationships:

1. The compatibilizer has a Hildebrand solubility parameter ≦19 $(MPa)^{1/2}$.

2. The compatibilizer has a melting point (Tp)>the melting point of the PE of the second layer (T2).
3. The compatibilizer has a melting point ≦the melting point of the PMP of the first layer (T1).
4. T1−Tp≦90.0° C., e.g., ≦75.0° C., such as ≦65.0° C.
5. Tp−T2≦120.0° C., e.g., ≦40.0° C., such as ≦30.0° C.

In particular embodiments, the compatibilizer includes poly(α-olefin), but excluding PE homopolymer. For example, the compatibilizer can be a polymer or copolymer derived from one or more of $C_3^+$ poly(α-olefin) such as PP, polybutene-1, polypentene-1, PMP, polyoctene-1, and polyhexene-1. In particular embodiments, the compatibilizer may include a blend of PMP and PP. Where a blend is employed, the weight ratio of PMP to PP (based on the weight of the compatibilizer) may be, e.g., in the range of from about 20:1 to 0.05:1, in other embodiments from 5:1 to 0.2:1, and in other embodiments from 2:1 to 0.5:1.

In these or other embodiments, the compatibilizer includes a polymer having a relatively high crystallinity, e.g., isotactic PP having an Mw in the range of from about $0.8 \times 10^6$ to about $3.0 \times 10^6$, an MWD in the range of from about 2.0 to about 8.5, and a ΔHm ≧90.0 J/g.

Other Species

Optionally, inorganic species (such as species containing silicon and/or aluminum atoms), and/or heat-resistant polymers such as those described in PCT Publications No. WO 2007/132942 and WO 2008/016174 (both of which are incorporated by reference herein in their entirety) can be present in the first and/or second layer.

When the microporous membrane is produced by extrusion, the final microporous membrane generally comprises the polymer used to produce the extrudate. A small amount of diluent or other species introduced during processing can also be present, generally in amounts less than 1 wt. % based on the weight of the membrane. A small amount of polymer molecular weight degradation might occur during processing, but this is acceptable. In a form, molecular weight degradation during processing, if any, causes the value of MWD of the polymer in the membrane to differ from the MWD of the polymer used to produce the membrane (e.g., before extrusion) by no more than, e.g., about 10%, or no more than about 1%, or no more than about 0.1%.

Mw and MWD Determination

Polymer Mw and MWD can be determined using a High Temperature Size Exclusion Chromatograph or "SEC", (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)." Three PLgel Mixed-B columns (available from Polymer Laboratories) are used for the Mw and MWD determination. For PE, the nominal flow rate is 0.5 cm³/min; the nominal injection volume is 300 μL; and the transfer lines, columns, and the DRI detector are contained in an oven maintained at 145° C. For PP and PMP, the nominal flow rate is 1.0 cm³/min; the nominal injection volume is 300 μL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. The same solvent is used as the SEC eluent. Polymer solutions are prepared by placing dry polymer in a glass container, adding the desired amount of the TCB solvent, and then heating the mixture at 160° C. with continuous agitation for about 2 hours. The concentration of polymer solution is 0.25 to 0.75 mg/ml. Sample solutions are filtered off-line before injecting to GPC with 2 μm filter using a model SP260 Sample Prep Station (available from Polymer Laboratories).

The separation efficiency of the column set is calibrated with a calibration curve generated using seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (logMp vs. retention volume) is generated by recording the retention volume at the peak in the DRI signal for each PS standard and fitting this data set to a 2nd-order polynomial. Samples are analyzed using IGOR Pro, available from Wave Metrics, Inc.

Three-Layer Structure

Particular embodiments of the invention are directed toward microporous membranes that include at least three layers: first and third layers with a second layer situated between the first and third layers. Optionally, the first and third layers have substantially the same thickness and substantially the same composition. For example, in an embodiment, the first and third layers each include ≧20.0 wt. % PMP based on the total weight of the layer. Optionally, the second layer includes ≧75.0 wt. PE and ≦25.0 wt. % compatibilizer, based on the total weight of the second layer. While the invention will be described in terms of such a multi-layer membrane produced in a wet process, it is not limited thereto, and the description is not meant to foreclose other embodiments within the broader scope of the invention.

Second Layer—Amount of Compatibilizer

In one or more embodiments, the second layer includes ≧1.0 wt. %, e.g., ≧2.50 wt. % of compatibilizer, in other embodiments ≧5.0 wt. %, in other embodiments ≧7.5 wt. %, and in other embodiments ≧10.0 wt. % compatibilizer based upon the total weight of the second layer. In these or other embodiments, the second layer includes ≦25.0 wt. %, in other embodiments ≦18.0 wt. %, in other embodiments ≦16.0 wt. %, and in other embodiments ≦12.0 wt. % compatibilizer based upon the total weight of the second layer. Optionally, the second layer includes <25.0 wt. % compatibilizer. Optionally, the second layer includes compatibilizer in an amount in the range of about 2.50 wt. % to about 20.0 wt. %, e.g., 5.0 wt. % to 18.0 wt. %, such as 7.5 wt. % to 16.0 wt. % based on the total weight of the second layer.

In particular embodiments, the compatibilizer includes a combination of PMP and PP. When such a combination is used, the ratio of (i) the amount of PMP in the first layer (in wt. %, based on the weight of the first layer) to (ii) the amount of compatibilizer (PMP and PP) in the second layer (in wt. %, based on the weight of the second layer) is ≦30.0, e.g., ≦20.0, such as ≦18.0, or ≦15.0.

In these embodiments, the second layer includes ≧1.0 wt. %, in other embodiments ≧2.0 wt. %, in other embodiments ≧3.0 wt. %, and in other embodiments ≧4.0 wt. % of each of PMP and PP, based on the weight of the second layer. In these or other embodiments, the second layer includes ≦12.0 wt. %, in other embodiments ≦10.0 wt. %, in other embodiments ≦8.0 wt. %, and in other embodiments ≦6.0 wt. % of each of PMP and PP, based on the weight of the second layer. For example, the second layer can contain amount of PMP in the range of about 1.0 wt. % to about 11.0 wt. % and an amount of PP in the range of 1.0 wt. % to 11.0 wt. %.

Second Layer—Amount of Polyethylene

In one or more embodiments, the second layer includes ≧75.0 wt. %, e.g., ≧82.0 wt. % PE, in other embodiments ≧84.0 wt. %, in other embodiments ≧86.0 wt. %, and in other embodiments ≧88.0 wt. % PE based upon the total weight of the second layer. Optionally, the second layer includes >75.0% PE. In these or other embodiments, the second layer includes ≦99.0 wt. %, in other embodiments ≦96.0 wt. %, in other embodiments ≦94.0 wt. %, and in other embodiments ≦92.0 wt. % PE based upon the total weight of the second layer. Optionally, the second layer includes PE in an amount in the range of about 80.0 wt. % to about 97.5 wt. %, e.g., 82.0 wt. % to 95.0 wt. %, such as 84.0 wt. % to 92.5 wt. %, based upon the total weight of the second layer.

In an embodiment the second layer includes PE4, e.g., in an amount ≧5.0 wt. %, e.g., ≧15.0 wt. %, such as ≧25.0 wt. %, based on the weight of the second layer. In an embodiment, the second layer includes PE1 or PE2, or combined PE1 and PE2 in an amount ≧40.0 wt. %, e.g., ≧50.0 wt. %, such as ≧60.0 wt. %, based on the weight of the second layer. In an embodiment, the second layer includes PE3 in an amount ≦25.0 wt. %, e.g., ≦20.0 wt. %, such as ≦10.0 wt. %, based on the weight of the second layer.

First and Third Layers—Amount of Polymethylpentene

In one or more embodiments, the first and third layers each include ≧20.0 wt. %, e.g., ≧22.5 wt. % PMP, in other embodiments ≧23.0 wt. %, in other embodiments ≧24.0 wt. %, and in other embodiments ≧25.0 wt. % PMP based upon the total weight of the layer. In these or other embodiments, the first and third layers include ≦45.0 wt. %, in other embodiments ≦40.0 wt. %, in other embodiments ≦35.0, in other embodiments ≦30.0 wt. %, and in other embodiments ≦25.0 wt. % PMP based upon the weight of the layer (e.g., first or third layer as the case may be). For example, the first and third layers can contain PMP in an amount in the range of about 20.0 wt. % to 45.0 wt. %, e.g., 22.5 wt. % to 40.0 wt. %, such as 25.0 wt. % to 35.0 wt. % PMP based upon the weight of the layer.

First and Third Layers—Amount of Polypropylene

Although it is optional, the first and third layers may each include PP. In one or more embodiments, the first and third layers may include ≧5.0 wt. %, in other embodiments ≧10.0 wt. %, in other embodiments ≧15.0 wt. %, in other embodiments ≧20.0 wt. %, and in other embodiments ≧25.0 wt. % PP based upon the weight of the layer (e.g., the first or third layer as the case may be). In these or other embodiments, the first and third layers each include ≦45.0 wt. %, in other embodiments ≦40.0, in other embodiments ≦35.0 wt. %, in other embodiments ≦30.0 wt. %, and in other embodiments ≦25.0 wt. % PP based upon the total weight of the layer. For example, the amount of PP in each of the first and third layers can be in the range of about 0.0 wt. % to 45.0 wt. %, e.g., in the range of from 10.0 wt. % to 35.0 wt. %, such as in the range of 20.0 wt. % to 30.0 wt. % PP based upon the weight of the layer.

First and Third Layers—Amount of Polypropylene and Polymethylpentene

In certain embodiments where the first and third layers include PP and PMP (e.g., a blend), the first and third layers may each include ≧40.0 wt. %, in other embodiments ≧42.0 wt. %, in other embodiments ≧44.0 wt. %, and in other embodiments ≧46.0 wt. % PMP and PP combined based upon the total weight of the layer (e.g., first or third layer as the case may be). In these or other embodiments, the first and third layers include ≦65.0 wt. %, in other embodiments ≦64.0 wt. %, in other embodiments ≦63.0 wt. %, and in other embodiments ≦62.0 wt. % PMP and PP combined based upon the total weight of the layer. For example, the combined amount of PMP and PP in each of the first and third layers can be in the range of about 40.0 wt. % to about 65.0 wt. %, e.g., 42.0 wt. % to 64.0 wt. %, such as 44.0 wt. % to 63.0 wt. % PMP and PP combined based upon the total weight of the layer.

First and Third Layers—Amount of Polyethylene

In one or more embodiments, the first and third layers each include ≧10.0 wt. %, in other embodiments ≧30.0 wt. %, in other embodiments ≧40.0 wt. %, in other embodiments ≧55.0 wt. %, in other embodiments ≧60.0 wt. %, and in other embodiments ≧75.0 wt. % PE based upon the total weight of the layer (e.g., first or third layer as the case may be). In these or other embodiments, the first and third layers each include ≦80.0 wt. %, in other embodiments ≦75.0 wt. %, in other embodiments ≦65.0 wt. %, in other embodiments ≦60.0 wt. %, in other embodiments ≦50.0 wt. %, and in other embodiments ≦40.0 wt. % PE based upon the total weight of the layer. In these or other embodiments, the first and third layers each include an amount of PE in the range of about 10.0 wt. % to about 80.0 wt. %, in e.g., 25.0 wt. % to 67.5 wt. %, based upon the weight of the layer. In an embodiment, each of the first and third layers contain (i)≧5.0 wt. % PE4 and/or (ii) ≧10.0 wt. % PE1 or PE2 or a combination of PE1 and PE2.

Methods for Producing the Membrane

The production of the microporous membrane is described in terms of the wet process, though the invention is not limited thereto, and this description is not meant to foreclose other embodiments within the broader scope of the invention.

In an embodiment, the multi-layer microporous membrane of the invention is a two-layer membrane. In another embodiment, the multi-layer microporous membrane has at least three layers. In an embodiment, the membrane is a three-layer membrane having first and third layers comprising a first layer material and a second layer comprising a second layer material, the second layer being located between and in layer-to-layer contact with the first and third layers. The first layer material (also called the first polymer blend) generally comprises the same polymers (in the same relative amounts) as are specified in the preceding description of the membrane's first layer or first and third layers. Likewise, the second layer material (also called the second polymer blend) generally comprises the same polymers (in the same relative amounts) as are specified in the preceding description of the membrane's second layer.

The process for producing the membrane involves removing diluent from a multi-layer extrudate. The first and third layers of the extrudate comprise the first layer material and at least a first diluent and the second layer of the extrudate comprises the second layer material and at least a second diluent. The first and third layers can be outer layers of the extrudate, also called skin layers. Those skilled in the art will appreciate that the third layer of the extrudate could be produced from a different layer material, e.g., the third layer material, and could have a different thickness than the first layer. After extrusion, at least a portion of the first and second diluents are removed from the extrudate. The process can further comprise stretching the extrudate in MD and/or TD. The stretching can be conducted before and/or after diluent removal. An embodiment for producing a three-layer membrane will now be described in more detail.

The First Mixture

A first mixture is produced by combining the first layer material (which has optionally been dry-mixed or melt-blended, or is, e.g., in the form of a reactor blend) and a first diluent. The first diluent (which can be a combination of diluents) can be, e.g., a solvent for the polymers of the first layer material. The first mixture can optionally contain additives such as one or more antioxidants. In an embodiment, the amount of such additives does not exceed 1.0 wt. % based on the weight of the mixture of polymer and diluent.

The diluent can comprise species capable of forming a single phase in conjunction with the first layer material at the extrusion temperature. For example, the first diluent can be a solvent for the polymers of the first layer material. Representative diluent examples include aliphatic or cyclic hydrocarbon such as nonane, decane, decalin and paraffin oil, and phthalic acid ester such as dibutyl phthalate and dioctyl phthalate. Paraffin oil with kinetic viscosity of 20-200 cSt at 40° C. can be used. The choice of first diluent, mixing condition, extrusion condition, etc. can be the same as those disclosed in PCT Publication No. WO 2008/016174, for example, which is incorporated by reference herein in its entirety.

The amount of first diluent in the first mixture is not critical. In an embodiment, the amount of first diluent is in the range of about 50 wt. % to about 85 wt. %, e.g., 60 wt. % to 80 wt. %, based on the combined weight of the first mixture. The temperature to which the first mixture is exposed during mixing should be sufficiently high to produce a single-phase mixture for extrusion, e.g., a temperature $\geq 210.0°$ C., e.g., $\geq 220.0°$ C., such as $\geq 230.0°$ C. or even $\geq 240.0°$ C., but not exceeding the temperature at which the diluent or polymer would experience significant molecular weight degradation, for example.

The Second Mixture

The second mixture is produced from the second layer material and the second diluent. The second mixture can be produced by the same methods used to produce the first mixture. In an embodiment, (a) the amount of polymer in the second mixture is $\leq 28.0$ wt. % based on the weight of the second mixture, (b) the compatibilizer is PP and PMP, and (c) the ratio of (i) the amount of PMP in the first mixture (in wt. %, based on the weight of the first mixture) to (ii) the amount of compatibilizer (PMP and PP) in the second mixture (in wt. %, based on the weight of the second mixture) is $\leq 3.70$, e.g., $\leq 3.60$, such as $\leq 3.50$, or $\leq 3.25$. The second diluent can be selected from among the same diluents as the first diluent. And while the second diluent can be (and generally is) selected independently of the first diluent, the diluent can be the same as the first diluent, and can be used in the same relative concentration as the first diluent is used in the first mixture. The temperature to which the second mixture is exposed during mixing should be sufficiently high to produce a single-phase mixture for extrusion, e.g., a temperature $\geq 210.0°$ C., e.g., $\geq 220.0°$ C., such as $\geq 230.0°$ C. or even $\geq 240.0°$ C., but not exceeding the temperature at which the diluent or polymer would experience significant molecular weight degradation, for example.

Extrusion

In an embodiment, the first mixture is conducted from a first extruder to first and third dies and the second mixture is conducted from a second extruder to a second die. A layered extrudate in sheet form (i.e., a body significantly larger in the planar directions than in the thickness direction) can be extruded from the first, second, and third dies to produce a multi-layer extrudate having a first skin layer comprising the first mixture, a second skin layer comprising the third mixture, and a core layer comprising the second mixture.

The choice of die or dies and extrusion conditions can be the same as those disclosed in PCT Publication No. WO 2008/016174, for example. The temperature to which the first and second mixtures are exposed within the die should be sufficiently high so as to maintain each of the first and second mixtures as a single phases (e.g., in the molten state) during extrusion, e.g., a temperature $\geq 210.0°$ C., $\geq 220.0°$ C., such as $\geq 230.0°$ C. or even $\geq 240.0°$ C., but not exceeding the temperature at which the diluent or polymer would experience significant molecular weight degradation, for example.

Extrudate Cooling (Optional)

The multi-layer extrudate can be exposed to a temperature in the range of 15° C. to 50° C. to form a cooled extrudate. Optionally, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publication No. WO 2008/01617, for example. In an embodiment, the cooled extrudate has a thickness $\leq 10$ mm, e.g., in the range of 0.1 mm to 10 mm, or 0.5 mm to 5 mm. Generally, the second layer of the cooled extrudate has a thickness of 60% to 80% of the cooled extrudate's total thickness; and the first and third layers of the cooled extrudate have substantially the same thickness, the thickness of the first and third layer each being in the range of 10% to 20% of the cooled extrudate's total thickness.

Extrudate Stretching (Optional)

The extrudate (or cooled extrudate) can be stretched (referred to as "upstream" stretching or orientation) in at least one direction (e.g., at least one planar direction, such as MD or TD) to produce a stretched extrudate. Optionally, the extrudate is stretched simultaneously in TD and MD to a magnification factor in the range of 4 to 6. Suitable stretching methods are described in PCT Publication No. WO 2008/016174, for example. While not required, the MD and TD magnifications can be the same. In an embodiment, the stretching magnification is equal to 5 in MD and TD. The magnification factor operates multiplicatively on film size. For example, a film having an initial width (TD) of 2.0 cm that is stretched in TD to a magnification factor of 4 fold will have a final width of 8.0 cm.

While not required, the stretching can be conducted while exposing the extrudate to a temperature in the range of from about Tcd to Tm, where Tcd and Tm are defined as the crystal dispersion temperature and melting point of the PE having the lowest melting point among the polyethylenes used to produce the extrudate. The crystal dispersion temperature is determined by measuring the temperature characteristics of dynamic viscoelasticity according to ASTM D 4065. In an embodiment where Tcd is in the range of about 90 to about 100° C., the stretching temperature can be from about 90° C. to about 125° C.; preferably from about 100° C. to about 125° C., more preferably from 105° C. to 125° C.

Optionally, the stretched extrudate can undergo a thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polymer and diluent, its length and width are referred to as the "wet" length and "wet" width. In an embodiment, the stretched extrudate is exposed to a temperature in the range of 110° C. to 125° C. for a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as downstream orientation and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infrared heating in an oven, etc. can be used with or instead of heated air.

Diluent Removal

In an embodiment, at least a portion of the first and second diluents are removed (or displaced) from the extrudate to form a membrane. A displacing (or "washing") solvent can be used to remove (wash away or displace) the first and second diluents. Process conditions for removing first and second diluents can be the same as those disclosed in PCT Publication No. WO 2008/016174, for example. The term "dried membrane" refers to an extrudate from which at least a portion of the diluent has been removed. It is not necessary to remove all diluent from the extrudate, although it can be desirable to do so since removing diluent increases the porosity of the final membrane.

In an embodiment, at least a portion of any remaining volatile species, such as washing solvent, can be removed from the dried membrane at any time after diluent removal. Any method capable of removing the washing solvent can be used, including conventional methods such as heat-drying, wind-drying (moving air), etc. Process conditions for removing volatile species, such as washing solvent, can be the same as those disclosed in PCT Publications No. WO 2008/016174 and WO 2007/132942, for example.

Membrane Orientation (Optional)

The membrane can be stretched (called "dry stretching" or "downstream stretching") in at least one direction. A dried membrane that has been subjected to downstream stretching is called an "oriented" membrane. Before downstream orientation, the dried membrane has an initial size in MD (a first dry length) and an initial size in TD (a first dry width). As used herein, the term "first dry width" refers to the size of the dried membrane in TD prior to the start of downstream orientation. The term "first dry length" refers to the size of the dried membrane in MD prior to the start of downstream orientation. Tenter stretching equipment of the kind described in WO 2008/016174 can be used, for example.

The downstream stretching can be conducted in MD, TD, or both directions. The dried membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). The TD dry stretching magnification factor can be in the range of from about 1.1 to about 1.6. When the stretching is conducted in both MD and TD, it can be sequential or simultaneous. Since TD heat shrinkage generally has a greater effect on battery properties than does MD heat shrinkage, the amount of TD dry magnification generally does not exceed the amount of MD dry magnification. When biaxial dry stretching is used, the dry stretching can be simultaneous in MD and TD or sequential. When the dry stretching is sequential, generally MD stretching is conducted first followed by TD stretching.

The downstream orientation is generally conducted while exposing the dried membrane to a temperature $\leq$Tm, e.g., in the range of from about Tcd−30° C. to Tm. In an embodiment, the stretching temperature is generally conducted with the membrane exposed to a temperature in the range of from about 70 to about 135° C., for example from about 120° C. to about 132° C., or from about 122° C. to about 130° C.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not critical, the upper limit of the stretching rate is preferably 50%/second to prevent rupture of the membrane.

Controlled Width Reduction (Optional)

Following downstream stretching, the dried membrane can be subjected to a controlled reduction in width from the second dry width to a third width, the third dry width being in the range of from the first dry width to about 1.4 times larger than the first dry width. The width reduction generally conducted while the membrane is exposed to a temperature $\geq$Tcd−30° C., but less than Tm. For example, the membrane can be exposed to a temperature in the range of from about 70° C. to about 135° C., such as from about 120° C. to about 132° C., or from about 125° C. to about 130° C. In an embodiment, the decreasing of the membrane's width is conducted while the membrane is exposed to a temperature that is lower than Tm. In an embodiment, the third dry width is in the range of from about 1.1 times larger than the first dry width to about 1.4 times larger than the first dry width.

It is believed that exposing the membrane to a temperature during the controlled width reduction that is $\geq$ the temperature to which the membrane was exposed during the TD stretching leads to greater resistance to heat shrinkage in the finished membrane.

Heat-Setting (Optional)

Optionally, the membrane is thermally treated (heat-set) one or more times after diluent removal, e.g., after downstream stretching, the controlled width reduction, or both. It is believed that heat-setting stabilizes crystals and make uniform lamellas in the membrane. In an embodiment, the heat setting is conducted while exposing the membrane to a temperature in the range Tcd to Tm, e.g., a temperature, e.g., in the range of from about 100° C. to about 135° C., such as from about 120° C. to about 132° C., or from about 122° C. to about 130° C. Generally, the heat setting is conducted for a time sufficient to form uniform lamellas in the membrane, e.g., $\leq$1,000 seconds, such as a time in the range of 1 to 600 seconds. In an embodiment, the heat setting is operated under conventional heat-set "thermal fixation" conditions. The term "thermal fixation" refers to heat-setting carried out while maintaining the length and width of the membrane substantially constant, e.g., by holding the membrane's perimeter using tenter clips during the heat setting.

Optional annealing, heated roller, hot solvent, cross linking, hydrophilizing, and coating treatments can be conducted if desired, e.g., as described in PCT Publication No. WO 2008/016174.

Membrane Structure and Properties

In an embodiment, the membrane is a dimensionally-stable (e.g., resistant to delamination) microporous membrane having at least two layers, where the respective layers have a composition derived from the polymers described above.

The membrane generally comprises the polymer used to produce the extrudate. A small amount of diluent or other species introduced during processing can also be present, generally in amounts $\leq$1.0 wt. % based on the weight of the membrane. A small amount of polymer molecular weight degradation might occur during processing, but this is acceptable. In an embodiment, the Mw of the polymers in the membrane decrease by a factor of $\leq$10%, for example, or ≦1.0%, or ≦0.1% with respect to the Mw of the polymers used to produce the membrane.

Thickness

In one or more embodiments, the microporous membrane includes a first layer having a thickness $T_1$, a second layer having a thickness $T_2$, and a third layer having a thickness $T_3$. In one or more embodiments, $T_2 \geqq T_1 + T_3$. In one or more embodiments, $T_1 \geqq 0.8$ times $T_3$, in other embodiments, $T_1 \geqq 0.9$ times $T_3$, and in other embodiments $T_1 = T_3$. In one or more embodiments, 20.0 times $T_1 \geqq T_2 \geqq 2.0$ times $T_1$, and in other embodiments 8.0 times $T_1 \geqq T_2 \geqq 3.0$ times $T_1$. In one or more embodiments, $T_2 \geqq 3.0$ μm, in other embodiments $T_2 \geqq 5.0$ μm, and in other embodiments $T_2 \geqq 10.0$ μm. In these or other embodiments, $T_2 \leqq 30.0$ μm, in other embodiments $T_2 \leqq 25.0$ μm, in other embodiments $T_2 \leqq 22.0$ μm, and in other embodiments $T_2 \leqq 20.0$ μm.

In an embodiment, the membrane is a multi-layer microporous membrane. The membrane's thickness is generally $\geqq 3.0$ μm. For example, the membrane can have a thickness $\leqq 30.0$ μm, such as in the range of from about 5.0 μm to about $2.0 \times 10^2$ μm, e.g., from about 10.0 μm to about 25.0 μm. Optionally, the second layer has a thickness in the range of from 60.0% to 80.0% of the membrane's total thickness; and the thicknesses of the first and third layers are each in the range of 10.0% to 20.0% of the membrane's total thickness. The membrane's thickness can be measured, e.g., by a contact thickness meter at 1.0 cm longitudinal intervals over the width of 10.0 cm, and then averaged to yield the membrane thickness. Thickness meters such as the Litematic available from Mitsutoyo Corporation are suitable. Non-contact thickness measurement methods are also suitable, e.g., optical thickness measurement methods.

Porosity

The membrane's porosity is measured conventionally by comparing the membrane's actual weight to the weight of an equivalent non-porous membrane of 100% polymer (equivalent in the sense of having the same polymer composition, length, width, and thickness). Porosity is then determined using the formula: Porosity %=100×(w2−w1)/w2, where "w1" is the actual weight of the membrane, and "w2" is the weight of an equivalent non-porous membrane (of the same polymers) having the same size and thickness. Optionally, the membrane's porosity is $\geqq 20\%$, e.g., in the range of 25.0% to 85.0%, such as in the range of 35.0 to 60.0%.

Normalized Air Permeability

In an embodiment, the membrane has a normalized air permeability $\leqq 30.0 \times 10^3$ seconds/100 cm³/20 μm (as measured according to JIS P8117). Since the air permeability value is normalized to the value for an equivalent membrane having a film thickness of 20 μm, the membrane's air permeability value is expressed in units of "seconds/100 cm³/20 μm". Optionally, the membrane's normalized air permeability is in the range of from about 20.0 seconds/100 cm³/20 μm to about 800.0 seconds/100 cm³/20 μm, or from about 100.0 seconds/100 cm³/20 μm to about 500.0 seconds/100 cm³/20 μm. Normalized air permeability is measured according to JIS P8117, and the results are normalized to the permeability value of an equivalent membrane having a thickness of 20 μm using the equation $A=20 \mu m^*(X)/T_1$, where X is the measured air permeability of a membrane having an actual thickness $T_1$ and A is the normalized air permeability of an equivalent membrane having a thickness of 20 μm. Optionally, the membrane has a normalized air permeability $\leqq 1.0 \times 10^4$ seconds/100 cm³/20 μm, e.g., $\leqq 1.0 \times 10^3$ seconds/100 cm³/20 μm, such as $\leqq 5.0 \times 10^2$ seconds/100 cm³/20 μm. For example, the membrane can have an air permeability in the range of about $1.0 \times 10^2$ seconds/100 cm³/20 μm to about $1.0 \times 10^3$ seconds/100 cm³/20 μm.

Normalized Pin Puncture Strength

The membrane's pin puncture strength is expressed as the pin puncture strength of an equivalent membrane having a thickness of 20 μm [mN/20 μm]. Pin puncture strength is defined as the maximum load measured at 23° C. when the membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength value of an equivalent membrane having a thickness of 20 μm using the equation $S=[20 \mu m^*(S_1)]/(T_1)$, where $S_1$ is a pin puncture strength "as measured" and $T_1$ is the average thickness of the membrane. Optionally, the membrane's normalized pin puncture strength is $\geqq 1.0 \times 10^3$ mN/20 μm, e.g., $\geqq 2.0 \times 10^3$ mN/20 μm, such as $\geqq 2.0 \times 10^3$ mN/20 μm. In an embodiment, the membrane has a normalized pin puncture strength in the range of about $2.0 \times 10^3$ mN/20 μm to about $8.0 \times 10^3$ mN/20 μm.

Shutdown Temperature

The microporous membrane's shutdown temperature is measured by the method disclosed in PCT Publication No. WO 2007/052663, which is incorporated by reference herein in its entirety. According to this method, the microporous membrane is exposed to an increasing temperature (5° C./minute beginning at 30° C.) while measuring the membrane's air permeability. The microporous membrane's shutdown temperature is defined as the temperature at which the microporous membrane's air permeability (Gurley Value) first exceeds $1.0 \times 10^5$ seconds/100 cm³. For the purpose of measuring membrane meltdown temperature and shutdown temperature, air permeability can be measured according to JIS P8117 using, e.g., an air permeability meter (EGO-1T available from Asahi Seiko Co., Ltd.). In an embodiment, the membrane has a shutdown temperature $\leqq 140.0°$ C., e.g., in the range of about 120.0° C. to about 140.0° C., such as in the range of from 130.0° C. to 138.0° C.

Meltdown Temperature (as Measure by Membrane Rupture)

Meltdown temperature is measured as follows. A sample of the microporous membrane measuring 5 cm×5 cm is fastened along its perimeter by sandwiching the sample between metallic blocks each having a circular opening of 12 mm in diameter. The blocks are then positioned so the plane of the membrane is horizontal. A tungsten carbide ball of 10 mm in diameter is placed on the microporous membrane in the circular opening of the upper block. Starting at 30° C., the membrane is then exposed to an increasing temperature at rate of 5° C./minute. The membrane's meltdown temperature is defined as the temperature at which the ball completely penetrates the sample, i.e., the temperature at which the sample breaks. In an embodiment, the membrane can have a meltdown temperature $\geqq 170.0°$ C., e.g., $\geqq 180.0°$ C., such as $\geqq 200.0°$ C. In an embodiment, the membrane has a meltdown temperature in the range of about 180.0° C. to about 210.0° C., e.g., in the range of from 190.0° C. to 205.0° C.

Electrochemical Stability

Electrochemical stability is a membrane property related to the membrane's resistance to chemical changes, e.g., oxidation, when the membrane is used as a BSF in a battery exposed to relatively high-temperature storage or use. Electrochemical stability has the units of mAh, and a lower value, representing less integrated charge loss during high-temperature storage or overcharging, is generally desired. The membranes of the invention have improved electrochemical stability and are therefore useful in high-power, high-capacity batteries. Such batteries include power tool batteries and automotive batteries, e.g., those used for starting or powering motor means for moving an electric vehicle or hybrid electric vehicles. The membranes have an electrochemical stability $\leq 1.0 \times 10^2$ mAh, which is desirable because such relatively high-power, high capacity applications are particularly sensitive to losses in battery capacity, such as self-discharge losses resulting from electrochemical instability of the BSF. The term "high-capacity" batteries generally means batteries capable of supplying 1 Ampere hour (1 Ah) or more, e.g., 2.0 Ah to 3.6 Ah. In an embodiment, the membrane's electrochemical stability is $\leq 80.0$ mAh, such as $\leq 75.0$ mAh, e.g., $\leq 50.0$ mAh. In an embodiment, the membrane's electrochemical stability is in the range of 1.0 mAh to 50.0 mAh, optionally 10.0 mAh to 35.0 mAh.

To measure membrane electrochemical stability, a membrane having a length (MD) of 70 mm and a width (TD) of 60 mm is located between an anode and cathode having the same planar dimensions as the membrane. The anode is made of natural graphite and the cathode is made of $LiCoO_2$. An electrolyte is prepared by dissolving $LiPF_6$ into a mixture of ethylene carbonate (EC) and methylethyl carbonate (EMC) (4/6, V/V) as 1 M solution. The electrolyte is impregnated into the membrane in the region between the anode and the cathode to complete the battery. The battery is charged to a voltage of 4.2 V while exposed to a temperature of 23° C. The battery is then exposed to temperature of 60° C. for 48 hours. Electrochemical stability is defined as the integrated current (in mAh) flowing between the voltage source and the battery over the 48-hour period.

Dimensional Stability

The multi-layer membrane's dimensional stability (resistance to delamination) is measured as follows: A membrane sample having a length=150.0 mm and a width=50.0 mm is laid flat on a glass substrate having length and width that are the same as or larger than that of the membrane and a thickness of about 10.0 mm. With the substrate oriented horizontally, a stainless steel needle (tip radius of curvature=5.0 mm) is placed in contact with the membrane and pressed against the membrane with a force of $1.0 \times 10^2$ gF. While exposing the membrane, needle, and substrate to a temperature of about 25.0° C., the substrate is translated 100.0 mm in the direction of the membrane's length (MD) while holding the needle stationary. Any polymer that separated from the membrane during the translation accumulated in the vicinity of the annular wedge-shaped region defined by the needle's surface and the surface of the membrane is removed and weighed after the 100.0 mm translation is completed. A membrane is "dimensionally stable" when the amount of accumulated polymer (referred to as "alpha") is $\leq 0.1$ mg.

Heat Shrinkage at 105° C. in at Least One Planar Direction

The membrane's shrinkage at 105° C. in MD and TD is measured as follows: (i) measure the size of a test piece of microporous membrane at ambient temperature in both the MD and TD, (ii) equilibrate the test piece of the microporous membrane at a temperature of 105.0° C. for 8 hours with no applied load, and then (iii) measure the size of the membrane in both the MD and TD. The heat (or "thermal") shrinkage in MD and TD can be obtained by dividing the result of measurement (i) by the result of measurement and (ii) expressing the resulting quotient as a percent.

Optionally, the membrane has a heat shrinkage at 105° C. in at least one planar direction (e.g., MD or TD) of $\leq 10.0\%$ e.g., $\leq 5.0\%$, such as in the range of from 0.5% to 5%. TD Heat Shrinkage at 130° C.$\leq 25\%$ and TD Heat Shrinkage at 170° C.$\leq 45\%$ In an embodiment, the membrane has a TD heat shrinkage at 130° C.$\leq 25.0\%$, for example in the range of from about 1.0% to about 20.0%, and/or a TD heat shrinkage at 170° C.$\leq 45.0\%$, e.g., from about 1.0% to about 40.0%.

The measurement of 130° C. and 170° C. heat shrinkage is slightly different from the measurement of heat shrinkage at 105° C., reflecting the fact that the edges of the membrane parallel to the transverse direction are generally fixed within the battery, with a limited degree of freedom allowed for expansion or contraction (shrinkage) in TD, particularly near the center of the edges parallel to MD. Accordingly, a square sample of microporous film measuring 50 mm along TD and 50 mm along MD is mounted in a frame at 23.0° C., with the edges parallel to TD fixed to the frame (e.g., by tape) leaving a clear aperture of 35 mm in MD and 50 mm in TD. The frame with sample attached is then exposed to a temperature of 130° C. or 170° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

Battery Separator Film and Battery

The membrane is permeable to liquid (aqueous and non-aqueous) at atmospheric pressure. Thus, the membrane can be used as a battery separator, filtration membrane, etc. The thermoplastic film is particularly useful as a BSF for a secondary battery, such as a nickel-hydrogen battery, nickel-cadmium battery, nickel-zinc battery, silver-zinc battery, lithium-ion battery, lithium-ion polymer battery, etc. In an embodiment, the invention relates to lithium-ion secondary batteries containing BSF comprising the thermoplastic film. Such batteries are described in PCT Patent Publication WO 2008/016174, which is incorporated herein by reference in its entirety. Such batteries can be used as a power source, e.g., for electric vehicles and hybrid electric vehicles.

The present invention will be explained in more detail referring to the following non-limiting examples.

EXAMPLE 1

(1) Preparation of the First Mixture

A first mixture is prepared as follows. First, combine (a) 25.0 wt. % of polymethylpentene (Mitsui Chemicals, Inc. TPX: MX002) having an MFR of 21 dg/min and a Tm of 222° C. (the PMP), (b) 25.0 wt. % of isotactic PP having an Mw of $1.1 \times 10^6$ and a Tm of 163.8° C. (the PP), (c) 20.0 wt. % of PE having an Mw of $5.6 \times 10^5$ and a Tm of 134.0° C. (the PE1), and (d) 30.0 wt. % of PE having a Mw of $1.9 \times 10^6$ and a Tm of 136.0° C. (the PE4), the weight percents being based on the weight of the combined polymer.

Next, 27.5 wt. % of the combined polymer is charged into a strong-blending double-screw extruder having an inner diameter of 58 mm and L/D of 42, and 72.5 wt. % liquid paraffin (50 cst at 40° C.) is supplied to the double-screw extruder via a side feeder. Mixing is conducted at 220° C. and 200 rpm to produce the first mixture, the weight percents being based on the weight of the first mixture.

(2) Preparation of Second Mixture

A second mixture is prepared in the same manner as the first except as follows: The combined polymer includes (a) 4.0 wt. % of the PMP, (b) 4.0 wt. % of the PP, (c) 74.0 wt. % of the PE1, and (d) 18.0 wt. % of the PE4, the weight percents being based on the weight of the combined polymer. 25.0 wt. % of the combined polymer is charged into the strong-blending double-screw extruder and 75.0 wt. % of the liquid paraffin is supplied to the side feeder. Mixing is conducted at 220° C. and 400 rpm to produce the second mixture.

(3) Production of Membrane

The first and second mixtures are supplied from their respective double-screw extruders to a three-layer-extruding T-die, and extruded therefrom to form a layered extrudate of first mixture/second mixture/first mixture at a layer thickness ratio of 15/70/15. The extrudate is cooled while passing through cooling rollers controlled at 20° C., to form a three-layer gel-like sheet, which is simultaneously biaxially stretched (upstream stretching) at 115° C. to a magnification of 5 fold in both MD and TD by a tenter-stretching machine.

The stretched three-layer gel-like sheet is fixed to an aluminum frame of 20 cm×20 cm, immersed in a bath of methylene chloride controlled at 25° C. to remove liquid paraffin with vibration of 100 rpm for 3 minutes, and dried by air flow at room temperature. While holding the size of the membrane substantially constant, the membrane is then heat-set at 125° C. for 10 minutes to produce the final microporous membrane. Selected starting materials, process conditions, and membrane properties are set out in Table 1.

EXAMPLES 2-10 AND COMPARATIVE EXAMPLES 1-3

Example 1 is repeated except as noted in Table 1. Starting materials and process conditions are the same as are used in Example 1, except as noted in the Table. For example, Examples 3 and 4 are subjected to downstream stretching at a temperature of 125° C. and a TD magnification factor of 1.2.

TABLE 1

| No. | | Example 1 | Example 2 | Example 3 | Example 4 |
|---|---|---|---|---|---|
| Resin composition | | | | | |
| First layer material | | | | | |
| PMP | Content (wt. %) | 25 | 25 | 30 | 30 |
| PP | Content (wt. %) | 25 | 25 | 30 | 30 |
| PE1 | Content (wt. %) | 20 | 20 | 30 | 30 |
| PE4 | Content (wt. %) | 30 | 30 | 10 | 10 |
| Amount of polymer in first mixture (wt. %); balance is Liquid Paraffin | | 27.5 | 27.5 | 33.0 | 33.0 |
| Second layer material | | | | | |
| PMP | Content (wt. %) | 4 | 0 | 5 | 8 |
| PP | Content (wt. %) | 4 | 8 | 5 | 8 |
| PE1 | Content (wt. %) | 74 | 74 | 60 | 54 |
| PE4 | Content (wt. %) | 18 | 18 | 30 | 30 |
| Amount of polymer in second mixture (wt. %); balance is Liquid Paraffin | | 25.0 | 25.0 | 28.5 | 28.5 |
| Production condition | | | | | |
| Extrudate | | | | | |
| Layer structure | | (I)/(II)/(I) | (I)/(II)/(I) | (I)/(II)/(I) | (I)/(II)/(I) |
| Layer thickness ratio | | 15/70/15 | 15/70/15 | 15/70/15 | 15/70/15 |
| Stretching of Gel-Like sheet | | | | | |
| Temperature (° C.) | | 115 | 115 | 115 | 115 |
| Magnification (MD × TD) | | 5 × 5 | 5 × 5 | 5 × 5 | 5 × 5 |
| Stretching of dried membrane | | | | | |
| Temperature (° C.) | | — | — | 125 | 125 |
| Magnification (TD) | | — | — | 1.2 | 1.2 |
| Heat setting, Temperature (° C.) | | 125 | 125 | 125 | 125 |
| Properties | | | | | |
| Average thickness (μm) | | 24 | 21 | 22 | 20 |
| Normalized Air Permeability (sec/100 cm³/20 μm) | | 428 | 412 | 540 | 570 |
| Porosity % | | 46 | 42 | 44 | 39 |
| Normalized Puncture Strength (mN/20 μm) | | 2140 | 2320 | 3820 | 3850 |
| Meltdown Temperature (° C.) | | 187 | 183 | 195 | 196 |
| Shutdown Temperature (° C.) | | 134 | 131 | 134 | 134 |
| TD Heat shrinkage at 105° C. (%) | | 2.8 | 2.9 | 2.6 | 1.9 |
| TD Heat shrinkage at 130° C. (%) | | 15 | 19 | 18 | 14 |
| TD Heat shrinkage at 170° C. (%) | | 35 | 37 | 33 | 31 |
| Alpha (wt. %) | | ≦0.1 mg | ≦0.1 mg | ≦0.1 mg | ≦0.1 mg |
| Electrochemical Stability (mAh) | | 25 | 27 | 20 | 19 |
| No. | | Example 5 | Example 6 | Example 7 | Example 8 |
| Resin composition | | | | | |
| First layer material | | | | | |
| PMP | Content (wt. %) | 40 | 30 | 25 | 30 |
| PP | Content (wt. %) | 10 | 40 | 25 | 30 |

TABLE 1-continued

| | | | | |
|---|---|---|---|---|
| PE1 Content (wt. %) | 32 | 30 | 20 | 10 |
| PE4 Content (wt. %) | 18 | 0 | 30 | 30 |
| Amount of polymer in first mixture (wt. %); balance is Liquid Paraffin | 25.0 | 30.0 | 27.5 | 27.5 |
| Second layer material | | | | |
| PMP Content (wt. %) | 25 | 10 | 8 | 4 |
| PP Content (wt. %) | 0 | 10 | 0 | 4 |
| PE1 Content (wt. %) | 70 | 62 | 74 | 74 |
| PE4 Content (wt. %) | 5 | 18 | 18 | 18 |
| Amount of polymer in second mixture (wt. %); balance is Liquid Paraffin. | 25.0 | 25.0 | 25.0 | 25.0 |
| Production condition | | | | |
| Extrudate | | | | |
| Layer structure | (I)/(II)/(I) | (I)/(II)/(I) | (I)/(II)/(I) | (I)/(II)/(I) |
| Layer thickness ratio | 15/70/15 | 16/68/16 | 15/70/15 | 15/70/15 |
| Stretching of Gel-Like sheet | | | | |
| Temperature (° C.) | 115 | 115 | 115 | 115 |
| Magnification (MD × TD) | 5 × 5 | 5 × 5 | 5 × 5 | 5 × 5 |
| Stretching of dried membrane | | | | |
| Temperature (° C.) | — | — | — | — |
| Magnification (TD) | — | — | — | — |
| Heat setting Temperature ° C. | 125 | 125 | 128 | — |
| Properties | | | | |
| Average thickness (μm) | 25 | 21 | 24 | — |
| Normalized Air Permeability (sec/100 cm³/20 μm) | 14485 | 25613 | 300 | — |
| Porosity % | 41 | 33 | 51 | — |
| Normalized Puncture Strength (mN/20 μm) | 1390 | 3230 | 1800 | — |
| Meltdown Temperature (° C.) | 208 | 202 | 185 | — |
| Shutdown Temperature (° C.) | 134 | 133 | 131 | — |
| TD Heat shrinkage at 105° C. (%) | 2.8 | 2.9 | 2.8 | 1.9 |
| TD Heat shrinkage at 130° C. (%) | 15 | 19 | 16 | 14 |
| TD Heat shrinkage at 170° C. (%) | 35 | 37 | 32 | 31 |
| Alpha (wt. %) | ≦0.1 mg | ≦0.1 mg | ≦0.1 mg | Delaminates during liquid paraffin removal |
| Electrochemical Stability (mAh) | 18 | 19 | 27 | — |

| No. | Example 9 | Example 10 | Example 11 | Comp. Ex. 1 | Comp. Ex. 2 | Comp. Ex. 3 |
|---|---|---|---|---|---|---|
| Resin composition | | | | | | |
| First layer material | | | | | | |
| PMP Content (wt. %) | 30 | 30 | 30 | — | 16.7 | 30 |
| PP Content (wt. %) | 30 | 30 | 30 | — | — | 40 |
| PE1 Content (wt. %) | 40 | 30 | 30 | 82 | 50 | 30 |
| PE4 Content (wt. %) | 0 | 10 | 10 | 18 | 33.3 | 0 |
| Amount of polymer in first mixture (wt. %); balance is Liquid Paraffin | 33.0 | 33.0 | 33.0 | 24.0 | 24.0 | 30.0 |
| Second layer material | | | | | | |
| PMP Content (wt. %) | 8 | 12 | 2 | — | — | 0 |
| PP Content (wt. %) | 8 | 12 | 2 | — | — | 0 |
| PE1 Content (wt. %) | 54 | 46 | 66 | — | — | 82 |
| PE4 Content (wt. %) | 30 | 30 | 30 | — | — | 18 |
| Amount of polymer in second mixture (wt. %); balance is Liquid Paraffin | 28.5 | 28.5 | 28.5 | — | — | 25.0 |
| Production condition | | | | | | |
| Extrudate | | | | | | |
| Layer structure | (I)/(II)/(I) | (I)/(II)/(I) | (I)/(II)/(I) | (I) | (I) | (I)/(II)/(I) |
| Layer thickness ratio | 15/70/15 | 15/70/15 | 15/70/15 | 100 | 100 | 15/70/15 |
| Stretching of Gel-Like sheet | | | | | | |
| Temperature (° C.) | 115 | 115 | 115 | 120 | 120 | 115 |
| Magnification (MD × TD) | 5 × 5 | 5 × 5 | 5 × 5 | 5 × 5 | 5 × 5 | 5 × 5 |
| Stretching of dried membrane | | | | | | |
| Temperature (° C.) | — | — | — | — | — | — |
| Magnification (TD) | — | — | — | — | — | — |
| Heat setting Temperature (° C.) | 125 | 125 | 125 | 125 | 125 | — |

TABLE 1-continued

| Properties | | | | | | |
|---|---|---|---|---|---|---|
| Average thickness (μm) | 19 | 20 | 22 | 19 | 20 | — |
| Normalized Air Permeability (sec/100 cm³/20 μm) | 5980 | 6349 | 3210 | 270 | 162 | — |
| Porosity % | 33 | 37 | 39 | 39 | 57 | — |
| Normalized Puncture Strength (mN/20 μm) | 3560 | 2970 | 3270 | n.m.* | n.m. | — |
| Meltdown Temperature (° C.) | 198 | 200 | 197 | 148 | 150 | — |
| Shutdown Temperature (° C.) | 131 | 131 | 133 | | | — |
| TD Heat shrinkage at 105° C. (%) | 3.1 | 3.5 | 3.6 | 2.9 | 3.1 | — |
| TD Heat shrinkage at 130° C. (%) | 14 | 15 | 16 | 34.7 | 24.6 | — |
| TD Heat shrinkage at 170° C. (%) | 37 | 38 | 34 | Break | 33.5 | — |
| Alpha (wt. %) | ≦0.1 mg | ≦0.1 mg | ≦0.1 mg | N/A | N/A | Delaminates during liquid paraffin removal |
| Electrochemical Stability (mAh) | 23 | 21 | 22 | 54 | 40 | — |

*n.m. = not measured
N/A = delamination measurement is not applicable to monolayer membrane Results Examples 1-4 demonstrate that a dimensionally-stable multi-layer membrane can be produced, the membrane having a skin-layer PMP content ≧20.0 wt. % and a core layer containing an effective amount of a second polymer compatible with PMP. The membranes have a meltdown temperature ≧180.0° C., a normalized pin puncture strength ≧2.0×10³ mN/20 μm, a normalized air permeability ≦600.0×10³ seconds/100 cm³/20 μm, a 105° C. TD heat shrinkage ≦3.0%, and an electrochemical stability ≦30.0 mAh. Example 5 shows that when (i) the membrane is a 3-layer membrane, (ii) the core and skin layers comprises PE, (iii) the compatibilizer is PMP, and (iv) the amount of compatibilizer in the core is ≧25.0 wt. %, based on the weight of the core layer, the resulting membrane has a decrease in air permeability (increased Gurley value) and a decrease in strength compared to the membranes of Examples 1-4. Increasing the amount of PP in the skin layer and decreasing the amount of compatibilizer in the core layer results in higher strength but lower meltdown temperature (See, e.g., Examples 5 and 6). Membrane strength decreases slightly when PMP is used as a compatibilizer instead of PP (See, e.g., Examples 2 and 7). Example 8 shows that when the compatibilizer is PMP and PP, the ratio of skin PMP to compatibilizer in the core should be ≦3.70 when the amount of polymer in the second mixture is ≦28.0 wt. % based on the weight of the second mixture. Examples 3, 4, 9, and 10 show that a core layer PE4 amount ≧25.0 wt. %, based on the weight of the core layer, can lead to higher strength in relatively high-permeability membranes. Comparative Examples 1 and 2 exhibit a low meltdown temperature because the PMP content is ≦20.0 wt. %. Comparative Example 3 delaminates because, it is believed, the membrane does not contain a compatibilizer in the core layer.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all inventive features which reside herein, including all features which would be treated as equivalents thereof by those skilled in the art to which this disclosure pertains.

When numerical lower limits and numerical upper limits are listed herein, ranges from any lower limit to any upper limit are contemplated.

What is claimed is:

1. A microporous membrane comprising:
   (a) a first layer including ≧20.0 wt. % polymethylpentene based on the weight of the first layer;
   (b) a second layer which (i) includes a compatibilizer and (ii) has a composition that is not substantially the same as that of the first layer; and
   (c) a third layer located between the first and second layers;
   wherein (i) the first and third layers have substantially the same composition and substantially the same thickness and each comprises 20.0 wt. % to 45.0 wt. % of the polymethylpentene, the polymethylpentene having an Mw of 1.0×10⁴ to 4.0×10⁶ and a Tm≧200.0° C.; 0.0 wt. % to 45.0 wt. % of an isotactic polypropylene having an Mw≧6.0×10⁵ and a Tm≧162.0° C.; and ≧10.0 wt. % polyethylene, the weight percents being based on the weight of the layer, (ii) the second layer comprises ≧5.0 wt % of the compatibilizer based on the weight of the layer, the compatibilizer comprising poly(α-olefin) excluding polyethylene homopolymer, and (iii) at least one of the first or third layers is in layer-to-layer contact with the second layer.

2. A battery separator comprising the membrane of claim 1.

3. A battery comprising an anode, a cathode, an electrolyte, and at least one separator located between the anode and cathode, the separator according to claim 2.

4. The battery of claim 3 and a load electrically connected to the battery.

5. The battery of claim 3, wherein the electrolyte contains lithium ions.

6. The battery of claim 5, wherein the battery is a lithium ion secondary battery used as a power source for an electric vehicle or hybrid electric vehicle.

* * * * *